United States Patent [19]

Toriumi

[11] Patent Number: 5,317,530

[45] Date of Patent: May 31, 1994

[54] ROUNDING OPERATION CIRCUIT

[75] Inventor: Yoshitaka Toriumi, Tokyo, Japan

[73] Assignee: NEC Corporation, Tokyo, Japan

[21] Appl. No.: 34,108

[22] Filed: Mar. 22, 1993

[30] Foreign Application Priority Data

Mar. 23, 1992 [JP] Japan .................................. 4-64425

[51] Int. Cl.$^5$ .............................................. G06F 7/38
[52] U.S. Cl. .................................................. 364/745
[58] Field of Search ................................ 364/745, 748

[56] References Cited

U.S. PATENT DOCUMENTS

| 3,891,837 | 6/1975 | Sunstein ............................ 364/745 |
| 4,589,084 | 5/1986 | Fling et al. ....................... 364/745 |
| 5,218,563 | 6/1993 | Juri et al. ........................ 364/745 |

OTHER PUBLICATIONS

CCITT SGXV WP XV/1 Specialist Group on Coding for Visual Telephony, Doc. #584, (1988-11), pp. 120-128.

Reverse DCT Operation in Motion Picture Processing VISP-LSI, Mochizuki et al., 1990, Telecommunication Assoc., National Conference Proceedings (Not Translated The Institute of Electronics, Information & Communication Engineers, Mar. 18-21, 1990, Tokyo, CHUO Univ. (Kasuga Campus)).

Assembly Language Instructions of Texas Instrument Third-Generation TMS320 User's Guide, 1988, pp. 11-141.

DSP56000/DSP56001 Digital Signal Processor User's Manual, by Motorola, Rev. 2, 1986, pp. A-191-A-193.

*Primary Examiner*—Long T. Nguyen
*Attorney, Agent, or Firm*—Whitham & Marhoefer

[57] ABSTRACT

A rounding operation circuit for arithmetic logic unit of a signal processor provided for counting fractions over ½ as one and disregarding the rest for the positive and negative number, which comprises a decoder circuit having an (n+1)-long input to which a first input signal represented by two's complement and a second n-bit long input signal for specifying the rounded position of the first signal are entered, when the first input signal is positive, a signal in which the bit at the rounded position is "1" and the rest is "0" is emitted based on the second input signal and, when the first input signal is negative, a signal in which the bits less significant than the bit at the rounded position are all "1" and the rest is "0" is emitted; arithmetic logic unit for adding the output signal of this decoder circuit and the first input signal; and a rounding circuit for counting 1 and cutting away 0 positively and negatively symmetrically to any rounding position, to allow a fast and accurate rounding operation.

4 Claims, 2 Drawing Sheets

ROUNDING OPERATION CIRCUIT

BACKGROUND OF THE INVENTION

The present invention relates to a rounding operation circuit used in an image signal processor.

According to the amendment of the recommendation H.261 of the CCITT p×64 bits/sec. television phone coding system, chances are that a system for DCT (discrete cosine transform) coding between motion compensating frames will be adopted. In this recommendation, an allowable range of the inverted DCT operating error is defined in order to suppress the mismatch of the coded image attended with transmission and reception. These are based on the content of "CCITT SGXV WP XV/1 Specialist Group on Coding for Visual Telephony, Doc, #584, (1988-11)".

In the reverse DCT operation, there is included a so-called rounding operation which cuts off the most significant 16 bits after 1 is added to, for example, the fifteenth bit of 31 bits as counted from below. As this rounding method, various means are conceivable, but it is reported that the foregoing reverse DCT operating error becomes minimal by carrying out the rounding operation symmetrically relative to the positive and negative (that is, rounding to the hearest whole number for absolute value, and cutting away zero and including one for binary number). For example, when the position of the decimal point lies at the eighth bit and the two's complement's 16-bit long signal, if it is positive, then "00000000, 10000000" (=0.5) is added and, if it is negative, then "00000000 01111111" (=0.4961) is added and the numbers lying at the places of the resulting number which are lower than the decimal point are cut away so that they can be rounded. These processes are proposed in a document 1, "Reverse DCT Operation in Motion Picture Processing VISP-LSI" Mochizuki et al, 1990, Telecommunication Association, National Conference Proceedings".

Next, a description is made with reference to the "RND" instruction of the chapter "Assembly Language Instructions" of the document 2 titled "Texas Instrument Third-Generation TMS320 User's Guide 1988, 9".

The instruction format is designated as "RND <src><dst>". Upon this specification, the result of the rounding operation of the source operand (,src.) is stored into a destination register (<dst>). In this case, the figure is rounded so that it becomes the nearest number of the single precision floating decimal point (that is, the eighth digit below the decimal point of the integer). In the case of the right middle value (that is, x.xxxxxxx5, where x denotes the integer value from 0 up to 9), the rounding operation is carried out in the positive direction.

These processes are specifically described hereinafter.

```
<src> = 07333C16EEFh = 1.79755599e + 02
<dst> = 0h
After the execution of the instruction:
<src> = 0733C16EEFh = 1.79755599e + 02
<dst> = 0733C16F00h = 1.79755600e + 02
```

As shown above, the rounding operation is achieved by representing the hexadecimal number by the decimal system.

Next, description is made with reference to the "RND" instruction of the chapter "Instruction Set Details" included within a third document "DSP56000 Digital Signal Processor User's Manual 1986".

The instruction format is designated as "RND<dst>". Upon this designation, the result of the rounding operation of the designation register <dst> is stored into the destination register <dst> as it is. The rounding operation of this processor is achieved by adding a constant (hereinafter referred to as a "rounding constant") to the bit to be rounded. In this case, the rounding constant is determined by the value of the scaling bit of the status register. Next, a correspondence between the place of this example where the rounding operation is carried out and the added value is shown in Table 1 below:

TABLE 1

| Status Register 1 | Status Register 2 | Scaling Mode | Rounding Position | Rounding Constant [55 ... 24, 23, 22 ... 0] | |
|---|---|---|---|---|---|
| 0 | 0 | no scaling | 23 | 0 ... 0 | 1 1 0 ... 0 |
| 0 | 1 | scale down | 24 | 0 ... 1 | 0 0 0 ... 0 |
| 1 | 0 | scale up | 22 | 0 ... 0 | 0 1 ... 0 |

According to the RND instruction of the document 2 processor, which is the aforementioned prior art, since a negative number "x, xxxxxxx5" is rounded in the positive direction, it is not possible to round the absolute number by counting fractions over ½ as one and cutting away the rest, which in turn makes it impossible to round at the desired bit position. Further, also in the document 3, since the negative number is rounded, it is impossible to round by counting its fractions over ½ as one and cutting away the rest leading to the same result.

SUMMARY OF THE INVENTION

Accordingly, an object of the present invention is to remove such a drawback and to provide a rounding operation circuit which allows the fractions over ½ of the absolute value to be counted as one and its rest to be cut away.

According to the present invention, there is provided a rounding operation circuit for performing a rounding operation on a first input signal represented in a two's complement form, comprising decoder means for receiving a second input signal designating a rounding position of said first input signal and for outputting a decoded signal in which a bit corresponding to said rounding position takes logic "1" and remaining bits take logic "0" when said first input signal is positive and in which a bit or bits less significant that said bit corresponding to said rounding position takes logic "1" and remaining bit or bits take logic "0" when said first input signal is negative; operational means for performing an adding operation on said first input signal and said decoded signal and for outputting a resultant signal; and rounding-down means performing such a rounding-down operation on said resultant signal that bits of said resultant signal less significant than said rounding position take logic "0".

Furthermore, in a preferred embodiment of the present invention, the second input signal for specifying the rounding position of the first input signal comprises four bits, or the value for specifying the rounding position comprises 16 bits having an immediate value.

In other words, since the rounding operation circuit of the present invention allows the symmetrical rounding operation intended for both the positive and the negative values to be achieved with a single instruction, it has an advantage that a faster and more accurate operation can be achieved than- when the operation is achieved using the conventional arithmetic logic means.

The present invention will be clearly understood from the following detailed description with reference to the accompanying drawings.

DESCRIPTION OF THE PREFERRED EMBODIMENTS

Figure 1:
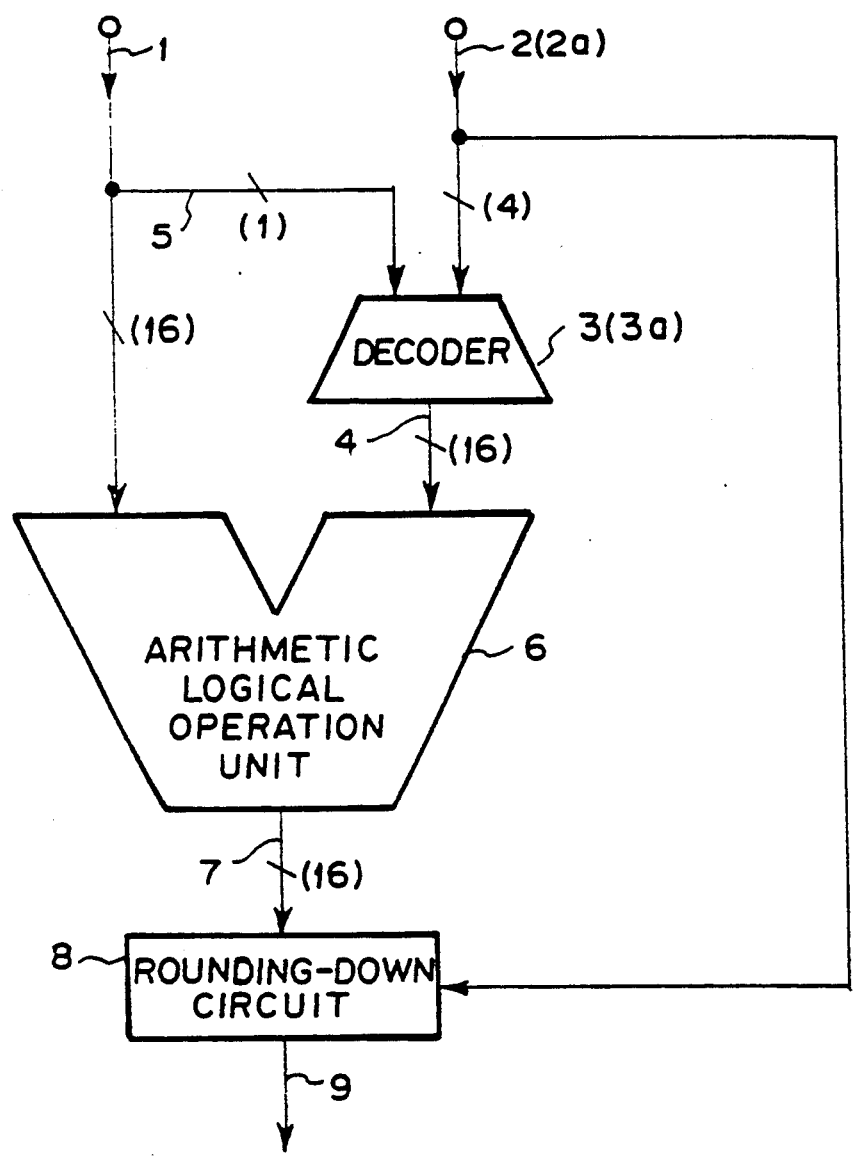
FIG. 1 is a block diagram of the rounding operation circuit embodying the present invention.
Figure 2:
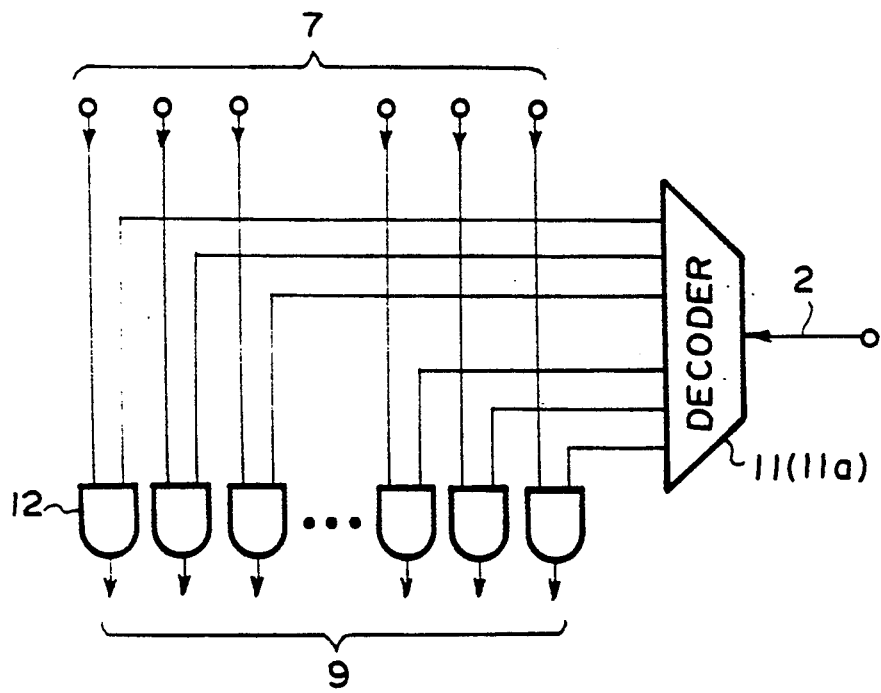
FIG. 2 is a block diagram of a rounding-down circuit shown in FIG. 1.

FIG. 1 is a block diagram of a first embodiment of the present invention, in which 1 denotes a first 16-bit long input signal, 2 a second 4-bit long input signal, 3 a decoder circuit into which 5 bits are entered and from which 16 bits are emitted, 4 a 16 bit long output signal of the decoder circuit, 5 a most significant bit of the first input signal, 6 an arithmetic logical operation unit or adder, 7 the output of the adder, 8 a rounding-down circuit with the second 4-bit long input signal as the input. In FIG. 2 is illustrated a circuit diagram showing an arrangement of the rounding-down circuit 8 which comprises a decoder 11 and a plurality of, sixteen in this case, AND gates 12. The following Table 2 is a truth table of the decoder 3.

The second input signal bit at the left column of the table 2 represents the bit arrangement from 0 to 15 which are added with the positive sign "0" while the second input signal bit at the right column represents the bit arrangement of the complement which is added with the negative sign "1". For the output of the decoder 3, when the input signal is positive, the rounding bit position is "1" and the rest is "0" while when the input signal is negative, the bits less significant than the bit at the rounding position are "1" and the rest is "0".

TABLE 2

| Second Input Signal | Decoder Output | Second Input Signal | Decoder Output |
|---|---|---|---|
| 00000 | 0000000000000001 | 10000 | 0000000000000000 |
| 00001 | 0000000000000010 | 10010 | 0000000000000011 |
| 00010 | 0000000000000100 | 10011 | 0000000000000111 |
| 00011 | 0000000000001000 | 10100 | 0000000000001111 |
| 00100 | 0000000000010000 | 10101 | 0000000000011111 |
| 00101 | 0000000000100000 | 10110 | 0000000000111111 |
| 00110 | 0000000001000000 | 10111 | 0000000001111111 |
| 00111 | 0000000010000000 | 11000 | 0000000011111111 |
| 01000 | 0000000100000000 | 11001 | 0000000111111111 |
| 01001 | 0000001000000000 | 11010 | 0000001111111111 |
| 01010 | 0000010000000000 | 11011 | 0000011111111111 |
| 01011 | 0000100000000000 | 11100 | 0000111111111111 |
| 01100 | 0001000000000000 | 11101 | 0001111111111111 |
| 01101 | 0010000000000000 | 11110 | 0011111111111111 |
| 01110 | 0100000000000000 | 11111 | 0111111111111111 |
| 01111 | 1000000000000000 | | |

Referring now to the operation of the rounding operation circuit according to the present invention, the second input signal 2 having an information regarding the position of the rounded bit of the input signal 1 is entered to a decoder circuit 3, which decodes the input signals 2 and the most significant bit 5 of the first input signal 1 according to the truth table 2, thereby to generate an output signal 4. The output signal 4 and the first input signal 1 are added to each other by means of the arithmetic logic means 6 to generate an output signal 7. In accordance with the input signal 2, the less significant bits than the rounding position in accordance with the input signal 2 are all turned to 0 by means of the rounding-down circuit 8 (FIG. 2), and the result is emitted as the output signal 9. Incidentally, the truth table of the decoder circuit 11 of FIG. 2 is represented in the following table 3.

TABLE 3

| Second Input Signal | Decoder Output | Second Input Signal | Decoder Output |
|---|---|---|---|
| 0000 | 1111111111111110 | 1000 | 1111111000000000 |
| 0001 | 1111111111111100 | 1001 | 1111111000000000 |
| 0010 | 1111111111111000 | 1010 | 1111100000000000 |
| 0011 | 1111111111110000 | 1011 | 1111000000000000 |
| 0100 | 1111111111100000 | 1100 | 1110000000000000 |
| 0101 | 1111111111000000 | 1101 | 1100000000000000 |
| 0110 | 1111111110000000 | 1110 | 1000000000000000 |
| 0111 | 1111111100000000 | 1111 | 0000000000000000 |

Alternatively, according to a second embodiment of the present invention, different from the first embodiment, a second 16-bit long input signal 2a and a decoder circuit 3a comprise a 16-bit input and a 16-bit output. In this case, the truth table of the decoder 3a is shown in Table 4 in which the value specifying the rounding position has an immediate value.

TABLE 4

| Second Input Signal | Decoder Output |
|---|---|
| 0000000000000001 | 0000000000000001 |
| 0000000000000010 | 0000000000000010 |
| 0000000000000100 | 0000000000000100 |
| 0000000000001000 | 0000000000001000 |
| 0000000000010000 | 0000000000010000 |
| 0000000000100000 | 0000000000100000 |
| 0000000001000000 | 0000000001000000 |
| 0000000010000000 | 0000000010000000 |
| 0000000100000000 | 0000000100000000 |
| 0000001000000000 | 0000001000000000 |
| 0000010000000000 | 0000010000000000 |
| 0000100000000000 | 0000100000000000 |
| 0001000000000000 | 0001000000000000 |
| 0010000000000000 | 0010000000000000 |
| 0100000000000000 | 0100000000000000 |
| 1000000000000000 | 0000000000000000 |
| 1000000000000001 | 0000000000000000 |
| 1000000000000010 | 0000000000000001 |
| 1000000000000100 | 0000000000000011 |
| 1000000000001000 | 0000000000000111 |
| 1000000000010000 | 0000000000001111 |
| 1000000000100000 | 0000000000011111 |
| 1000000001000000 | 0000000000111111 |
| 1000000010000000 | 0000000001111111 |
| 1000000100000000 | 0000000011111111 |
| 1000001000000000 | 0000000111111111 |
| 1000010000000000 | 0000001111111111 |
| 1000100000000000 | 0000011111111111 |
| 1001000000000000 | 0001111111111111 |
| 1010000000000000 | 0011111111111111 |
| 1010000000000000 | 0111111111111111 |
| 1100000000000000 | 0111111111111111 |

The operation of the operation circuit according to the second circuit will be described with reference also to FIG. 1, using the parenthesized numerals. The input signal 2a having the information regarding the position at the rounded bit of the rounded input signal 1 is entered to the decoder circuit 3a, which decodes the input signals 2a and 5 according to the truth table 4 to generate the output signal 4. The output signal 4 and the input signal 1 are added by means of the arithmetic logic means 6 and the result is emitted as the output signal 7. The bits less significant than the rounded bits according to the input signal 2a are all turned into zero by the rounding-down circuit 8 and the result is emitted as the output signal 9. Incidentally, the truth table of the decoder circuit 11a is illustrated in the following table 5.

TABLE 5

| Second Input Signal | Decoder Output |
|---|---|
| 0000000000000001 | 1111111111111110 |
| 0000000000000010 | 1111111111111100 |
| 0000000000000100 | 1111111111111000 |
| 0000000000001000 | 1111111111110000 |
| 0000000000010000 | 1111111111100000 |
| 0000000000100000 | 1111111111000000 |
| 0000000001000000 | 1111111110000000 |
| 0000000010000000 | 1111111100000000 |
| 0000000100000000 | 1111111000000000 |
| 0000001000000000 | 1111110000000000 |
| 0000010000000000 | 1111100000000000 |
| 0000100000000000 | 1111000000000000 |
| 0001000000000000 | 1110000000000000 |
| 0010000000000000 | 1100000000000000 |
| 0100000000000000 | 1000000000000000 |
| 1000000000000000 | 0000000000000000 |

What is claimed is:

1. A rounding operation circuit for performing a rounding operation on a first input signal represented in a two's complement form, comprising decoder means for receiving a second input signal designating a rounding position of said first input signal and for outputting a decoded signal in which a bit corresponding to said rounding position takes logic "1" and remaining bits take logic "0" when said first input signal is positive and in which a bit or bits less significant that said bit corresponding to said rounding position takes logic "1" and remaining bit or bits take logic "0" when said first input signal is negative; operational means for performing an adding operation on said first input signal and said decoded signal and for outputting a resultant signal; and rounding-down means performing such a rounding-down operation on said resultant signal that bits of said resultant signal less significant than said rounding position take logic "0".

2. The circuit according to claim 1 wherein said second input signal for specifying the rounding position of said first input signal comprises four bits.

3. The circuit according to claim 1 wherein said second input signal for specifying the rounding position of said first input signal is comprised of 16 bits in which the value specifying the rounding position has an immediate value.

4. A rounding circuit for rounding input data (1) represented in a two's complement form to produce rounded data, comprising a decoder supplied with control data indicative of a rounding position of said input data and outputting first decoded data when said input data is positive and second decoded data when said input data is negative, said first decoded data consisting of a bit that takes a first logic level and corresponds to said rounding position and remaining bits that take a second logic level, said second decoded data consisting of a bit or bits that take said first logic level and are less significant than said bit corresponding to said rounding position and remaining bit or bits that take said second logic level, and operational unit adding said input data with the decoded data derived from said decoder and outputting added data, and a rounding-down circuit producing said rounded data to said added data and said control data, said rounded data having a bit or bits that are less significant than a bit corresponding to said rounding position and rounded down to said second logic level.

* * * * *